United States Patent
Choi et al.

(10) Patent No.: US 8,464,223 B2
(45) Date of Patent: Jun. 11, 2013

(54) METHOD AND APPARATUS FOR EFFICIENT AND PRECISE DATARACE DETECTION FOR MULTITHREADED OBJECT-ORIENTED PROGRAMS

(75) Inventors: Jong-Deok Choi, Mount Kisco, NY (US); Keunwoo Lee, Seattle, WA (US); Robert W. O'Callahan, White Plains, NY (US); Vivek Sarkar, Stamford, CT (US); Manu Sridharan, Uniontown, PA (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 12/366,446

(22) Filed: Feb. 5, 2009

(65) Prior Publication Data
US 2009/0199162 A1 Aug. 6, 2009

Related U.S. Application Data

(62) Division of application No. 10/178,561, filed on Jun. 25, 2002, now Pat. No. 7,516,446.

(51) Int. Cl.
*G06F 9/44* (2006.01)
(52) U.S. Cl.
USPC ............ 717/126; 717/127; 717/128; 717/131
(58) Field of Classification Search
None
See application file for complete search history.

(56) References Cited

U.S. PATENT DOCUMENTS

| | | | |
|---|---|---|---|
| 6,009,269 A * | 12/1999 | Burrows et al. | 717/130 |
| 6,081,783 A | 6/2000 | Divine et al. | |
| 6,247,025 B1 | 6/2001 | Bacon | |
| 6,286,130 B1 | 9/2001 | Poulsen et al. | |
| 6,343,371 B1 * | 1/2002 | Flanagan et al. | 717/124 |
| 6,385,704 B1 | 5/2002 | Rao et al. | |
| 6,553,513 B1 | 4/2003 | Swoboda et al. | |
| 6,593,940 B1 | 7/2003 | Petersen et al. | |
| 6,681,280 B1 | 1/2004 | Miyake et al. | |
| 6,817,009 B2 * | 11/2004 | Flanagan et al. | 717/126 |
| 6,920,634 B1 | 7/2005 | Tudor | |
| 7,316,005 B2 * | 1/2008 | Qadeer et al. | 717/131 |
| 7,398,516 B2 * | 7/2008 | Berg et al. | 717/126 |
| 7,469,403 B2 * | 12/2008 | Choi et al. | 717/127 |
| 7,516,446 B2 * | 4/2009 | Choi et al. | 717/128 |
| 2002/0120428 A1 | 8/2002 | Christiaens | |
| 2002/0184444 A1 * | 12/2002 | Shandony | 711/118 |
| 2002/0194393 A1 * | 12/2002 | Hrischuk et al. | 709/318 |
| 2003/0014736 A1 | 1/2003 | Nguyen et al. | |

OTHER PUBLICATIONS

Choi et al., Efficient and precise datarace detection for multithreaded object-oriented programs, Jun. 2002, 12 pages, <http://delivery.acm.org/10.1145/520000/512560/p258-choi.pdf>.*

Ronsse et al., RecPlay: a fully integrated practical record/replay system, May 1999, 20 pages, <http://delivery.acm.org/10.1145/320000/312214/p133-ronsse.pdf>.*

(Continued)

*Primary Examiner* — Thuy Dao
(74) *Attorney, Agent, or Firm* — Vazken Alexanian; McGinn IP Law Group, PLLC

(57) ABSTRACT

A method of detecting a datarace between memory accesses within a program includes determining whether a datarace exists between a first access event in a first statement and a second access event in a second statement. It is then determined whether a third statement is more weakly protected than one of the first statement and the second statement.

17 Claims, 2 Drawing Sheets

OTHER PUBLICATIONS

Huang et al., View-based consistency and false sharing effect in distributed shared memory, Apr. 2001, 10 pages, <http://delivery.acm.org/10.1145/380000/377084/p51-huang.pdf>.*

Christoph von Praun and Thomas R. Gross, Object Race Detection, 2001, pp. 70-81, 11 pages total.

J-D Choi et al., Static Datarace Analysis for Multithreaded Object-Oriented Programs, Aug. 9, 2001 (19 pages), [Online] [Retrieved at] <www.research.ibm.com/dejavu/rc22146.pdf>.

J-D Choi et al., "Deterministic Replay of Java Multithreaded Applications", Aug. 1998 (12 pages). [Online] [Retrieved at] <http://portal.acm.org/citabon.cfm?id=281041>.

* cited by examiner

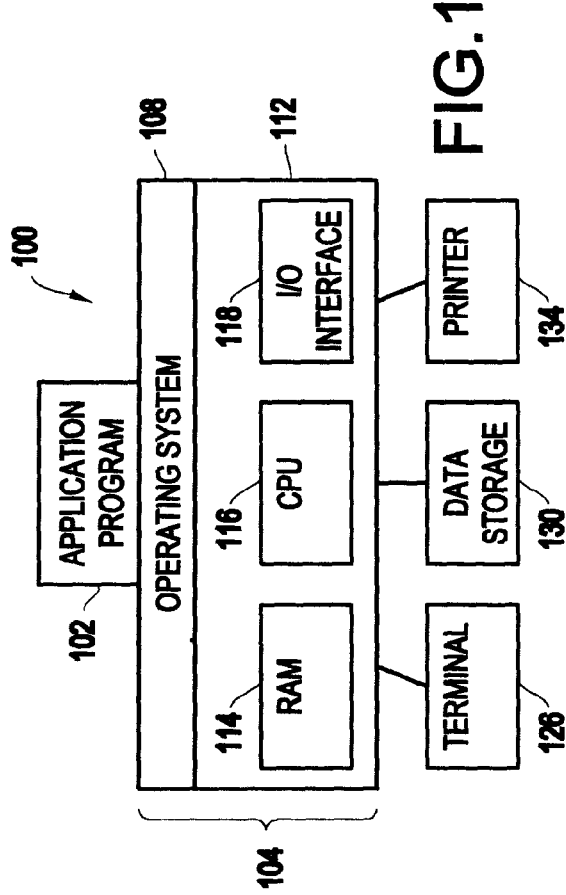
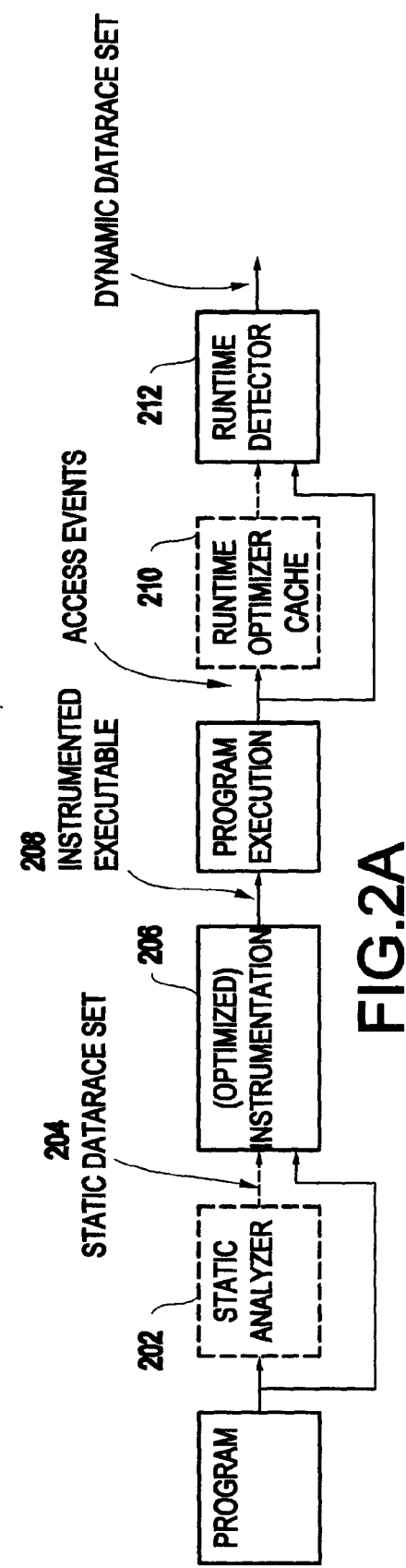

METHOD AND APPARATUS FOR EFFICIENT AND PRECISE DATARACE DETECTION FOR MULTITHREADED OBJECT-ORIENTED PROGRAMS

The present application is a Divisional Application of U.S. patent application Ser. No. 10/178,561, now U.S. Pat. No. 7,516,446, issued on Apr. 7, 2009, and having filing date of Jun. 25, 2002.

BACKGROUND OF THE INVENTION

1. Field of the Invention

The present invention generally relates to datarace detection for multithreaded object-oriented programs. More particularly, this invention provides a unique combination of static datarace analysis, optimized instrumentation, runtime access caching and runtime detection phases.

2. Description of the Related Art

A datarace occurs in a multithreaded program when two threads access the same memory location with no ordering constraints enforced between the accesses, such that at least one of the accesses is a write. In most cases, a datarace is a programming error. Furthermore, programs containing dataraces are notoriously difficult to debug because they can exhibit different functional behaviors even when executed repeatedly with the same set of inputs and the same execution order of synchronization operations. Because of the detrimental effects of dataraces on the reliability and comprehensibility of multithreaded software, it is widely recognized that tools for automatic detection of dataraces can be extremely valuable. As a result, there has been a substantial amount of past work in building tools for analysis and detection of dataraces.

Most previous dynamic datarace detection techniques have been relatively precise, in that most races reported correspond to truly unsynchronized accesses to shared memory. However, these detectors incur order-of-magnitude overheads in the range of 3 times to 30 times. Recent approaches reduce the overhead of datarace detection, but at the cost of decreased precision. For example, monitoring dataraces at the object level rather than the memory-location level reduced overheads for datarace detection to the range of 16% to 129% but resulted in many spurious race reports.

Past research on datarace detection can be classified as ahead-of-time, on-the-fly, or post-mortem. These approaches offer different trade-offs along ease-of-use, precision, efficiency, and coverage dimensions.

Ahead-of-time datarace detection is usually performed in static datarace analysis tools which yield high coverage by considering the space of all possible program executions and identifying dataraces that might occur in any one of them. Flanagan and Freund's datarace detection tool is a static tool for Java (C. Flanagan and S. N. Freund. Type-based race detection for java. In Proceedings of the ACM SIGPLAN Conference on Programming Language Design and Implementation (PLDI), pages 219-232, June 2000) based on type-based equivalence of lock variables. Guava is a dialect of Java that statically disallows dataraces by preventing concurrent accesses to shared data (D. F. Bacon, R. E. Strom, and A. Tarafdar. Guava: A dialect of java without data races. In ACM Conference on Object Oriented Programming Systems, Languages, and Applications, 2000). Only instances of classes belonging to the class category called monitor can be shared by multiple threads. By serializing all accesses to fields or methods of the same shared data, Guava can prevent dataraces. Boyapati and Rinard propose a system of type annotations for Java that ensures a well-typed program is datarace-free and allows the programmer to write a generic class and subclass it with different protection mechanisms (C. Boyapati and M. Rinard. A parameterized type system for race-free java programs. In ACM Conference on Object-Oriented Programming Systems, Languages, and Application, 2001).

Warlock is an annotation-based static datarace detection tool for ANSI C programs (N. Sterling. Warlock: A static data race analysis tool. In USENIX Winter Technical Conference, pages 97-106, 1993), which also supports lock-based synchronization. Aiken and Gay's work statically detects dataraces in SPMD programs (A. Aiken and D. Gay. Barrier interference. In Proceedings of the $25^{th}$ Symposium on Principles of Programming Languages (POPL), pages 342-354, January 1998). Since SPMD programs employ barrier-style synchronizations, they need not track locks held at each statement.

The key advantage of dynamic analysis approaches such as on-the-fly and post-mortem datarace detection is the precision of the results (few or no false positives), but in past work this advantage usually came at a high cost in efficiency. A dynamic approach also has more limited coverage than a static approach because it only reports dataraces observed in a single dynamic execution. In some cases, dynamic tools can improve coverage by considering alternate orderings of synchronization operations that are consistent with the actual events observed in the original program execution (S. Savage, M. Burrows, G. Nelson, P. Sobalvarro, and T. E. Anderson. Eraser: A dynamic data race detector for multi-threaded programs. ACM Transactions on Computer Systems, 15(4): 391-411, 1997).

Dinning and Schonberg introduced the idea of detecting dataraces based on a proper locking discipline. Their system employed a detection approach based on both the happened-before relation and lock sets, which they called "lock covers." Their subtraction optimization uses a notion similar to the weaker-than relation described below, but they only suggest using the optimization in the detector itself.

Eraser's datarace detection algorithm is based on lock-based synchronization (S. Savage, M. Burrows, G. Nelson, P. Sobalvarro, and T. E. Anderson. Eraser: A dynamic data race detector for multi-threaded programs. ACM Transactions on Computer Systems, 15(4): 391-411, 1997). Eraser enforces the constraint that each shared memory location is protected by a unique lock throughout an execution. Eraser works independently of the input source language by instrumenting binary code, but its runtime overhead is in the range of 10 times to 30 times.

Praun and Gross's object race detection (C. v. Praun and T. Gross. Object race detection. In ACM conference on Object-Oriented Programming Systems, Languages, and Application, 2001) greatly improves on Eraser's performance by applying escape analysis to filter out non-datarace statements and by detecting dataraces at the object level instead of at the level of each memory location (their overhead ranges from 16% to 129% on the same benchmarks the inventors used, with less than 25% space overhead). However, their coarser granularity of datarace detection (which includes treating a method call on an object as a write) leads to the reporting of many dataraces which are not true dataraces i.e., the reported races do not indicate unordered concurrent accesses to shared state.

TRaDe is similar to object race detection in that they both apply escape analysis (M. Christianens and K. De Bosschere. TraDE, a topological approach to on-the-fly race detection in java programs. Proceedings of the Java Virtual Machine Research and Technology Symposium (JVM'01), April 2001), although TRaDe does the analysis dynamically. TraDe's datarace detection is based on the happens-before relation. TRaDe adds a runtime overhead ranging from 4 times to 15 times (M. Christianens and K. De Bosschere. TraDE, a topological approach to on-the-fly race detection in java programs. Proceedings of the Java Virtual Machine Research and Technology Symposium (JVM'01), April 2001) compared to an interpreter, with approximately 3 times space overhead.

AssureJ (Kuck & Associates, Inc., 1906 Fox Drive, champaign, IL 61820-7345, USA. AsureJ User's Manual, 2.0 edition, March 1999) and JProbe (KL Group, 260 King Street East, Toronto, Ontario, Canada. Getting Started with JProbe.) are commercial products that can dynamically detect dataraces in Java programs. AssureJ has been observed to have overhead ranging from 3 times to 30 times, while JProbe's memory requirements make its use practically impossible for any reasonably sized program.

Min and Choi's hardware-based scheme uses the cache coherence protocol, and Richards and Larus' work uses the Distributed Shared-Memory (DSM) computer's memory coherence protocol, respectively, in collecting information for on-the-fly datarace detection.

Most dynamic datarace detection techniques for SPMD programs work either as post-mortem tools or as on-the-fly tools, by collecting information from actual executions with software instrumentation. A post-mortem approach offers the possibility of improving on-line efficiency (by moving the bulk of the work to the post-mortem phase) at the cost of complicating ease-of-use. However, the size of the trace structure can grow prohibitively large thus making the post-mortem approach infeasible for long-running programs.

Another dimension that can be used to classify past work on datarace detection is the underlying concurrency model. Past work on datarace detection was historically targeted to multithreaded programs. However, those results are not applicable to the object-based concurrency models present in multithreaded object-oriented programming languages such as Java.

Netzer and Miller categorize dynamic dataraces into actual, apparent, and feasible dataraces (R. H. Netzer and B. P. Miller. What are race conditions? Some issues and formalizations. ACM Letters on Programming Languages and Systems, 1(1): 74-88, march 1992.). Choi and Min describe how to identify and reproduce the race frontier, which is the set of dataraces not affected by any other dataraces. By repeatedly reproducing and correcting the dataraces in the race frontier, one can identify all the dataraces that occur in executions.

Thus, past techniques for on-the-fly datarace detection either sacrificed precision for performance, leading to many false positive datarace reports, or maintained precision but incurred significant overheads in the range of 3 times to 30 times.

SUMMARY OF THE INVENTION

In view of the foregoing and other problems, drawbacks, and disadvantages of the conventional methods and structures, an object of the present invention is to provide a method and structure in which dataraces between two memory accesses within a program are detected dynamically.

The inventors provide a novel approach to dynamic datarace detection for multithreaded object-oriented programs. In contrast, the invention results in very few false positives and runtime overhead in the 13% to 42% range, making it both efficient and precise. This performance improvement is the result of a unique combination of complementary static and dynamic optimization techniques.

In a first aspect of the invention, a method of detecting a datarace between first and second memory accesses within a program, including: determining whether the first and second memory accesses are to the same memory location; determining whether the first and second memory accesses are executed by different threads in the program; determining whether the first and second memory accesses are guarded by a common synchronization object; and determining whether there is an execution ordering enforced between the first and second memory accesses.

In a second aspect of the invention, a method of detecting a datarace between memory accesses within a program, includes: determining whether a datarace exists between a first access event in a first statement and a second access event in a second statement; and determining whether a third statement is more weakly protected than one of the first statement and the second statement.

In a third aspect of the invention, a method for detecting a datarace between two memory accesses within a program, includes: inserting a pseudo-instruction trace after every instruction which accesses one of a field of an object, a static field and an array element; and eliminating said pseudo-instruction trace of a second of the two memory accesses based upon a determination using a static weaker-than relation.

In a fourth aspect of the invention a program storage device, readable by a machine, tangibly embodying instructions to perform a method for detecting a datarace, said method including: determining whether first and second memory accesses are to the same memory location; determining whether the first and second memory accesses are executed by different threads in the program; determining whether the first and second memory accesses are guarded by a common synchronization object; and determining whether there is an execution ordering enforced between the first and second memory accesses.

In a fifth aspect of the invention a program storage device, readable by a machine, tangibly embodying instructions to perform method steps for detecting a datarace between memory accesses within a program, said method including determining whether a datarace exists between a first access event in a first statement and a second access event in a second statement; and determining whether a third statement is more weakly protected than one of the first statement and the second statement.

In a sixth aspect of the invention a program storage device, readable by a machine, tangibly embodying instructions to perform method steps for detecting a datarace between two memory accesses within a program, said method including: inserting a pseudo-instruction trace after every instruction which accesses one of a field of an object, a static field and an array element; identifying a psuedo-instruction trace for an instruction that contains information which is subsumed by another instruction; and eliminating the pseudo-instruction trace for the instruction.

In a seventh aspect of the invention, a system for detecting a datarace within a program, said system including: a first module for instrumenting the program; and a second module for detecting the datarace during a runtime operation of the program, wherein the first module inserts trace statements into the program at non-redundant trace points based upon a determination that each trace for each instruction does not trace an instruction which contains information which is subsumed by another instruction.

In an eighth aspect of the invention a system for dynamically detecting a datarace within a program, said system including: means for inserting a pseudo-instruction trace after every instruction which accesses one of a field of an object, a static field and an array element and means for identifying a psuedo-instruction trace for an instruction that contains information which is subsumed by another instruction; and means for eliminating the pseudo-instruction trace for the instruction The present invention provides a novel approach to dynamic datarace detection for multithreaded object-oriented programs which is both efficient and precise. An exemplary embodiment of the invention uses a weaker-than relation to identify memory accesses that are probably redundant from the viewpoint of datarace detection. Another source of reduction in overhead is that an exemplary embodiment of the invention does not report all access pairs that participate in dataraces, but instead guarantees that at least one access is reported for each distinct memory location involved in a datarace. The invention results in runtime overhead ranging from 13% to 42%, which is well below the runtime overhead of previous approaches with comparable precision. This performance is obtained through a combination of static and dynamic optimization techniques which complement each other in reducing the overhead of a datarace detector. Furthermore, almost all the dataraces reported by an exemplary embodiment of the invention correspond to actual bugs, and the precise output of our invention allows us to easily find and understand the problematic source code lines in our test programs.

While Dinning and Schonberg introduced the idea of detecting dataraces based on a proper locking discipline, their system employed a detection approach based on both the happened-before relation and lock sets, which they called "lock covers." Their subtraction optimization uses a notion similar to the weaker-than relation, but they only suggest using the optimization in the detector itself, while the inventors employ the notion in many stages of our detection framework.

BRIEF DESCRIPTION OF THE DRAWINGS

The foregoing and other purposes, aspects and advantages will be better understood from the following detailed description of an exemplary embodiment of the invention with reference to the drawings, in which:

FIG. 1 illustrates an exemplary computer processing system 100 on which an embodiment of the present invention may be implemented;

FIG. 2A shows an overall architecture 200 of one exemplary embodiment of the invention;

DETAILED DESCRIPTION OF EXEMPLARY EMBODIMENTS OF THE INVENTION

Figure 2B:
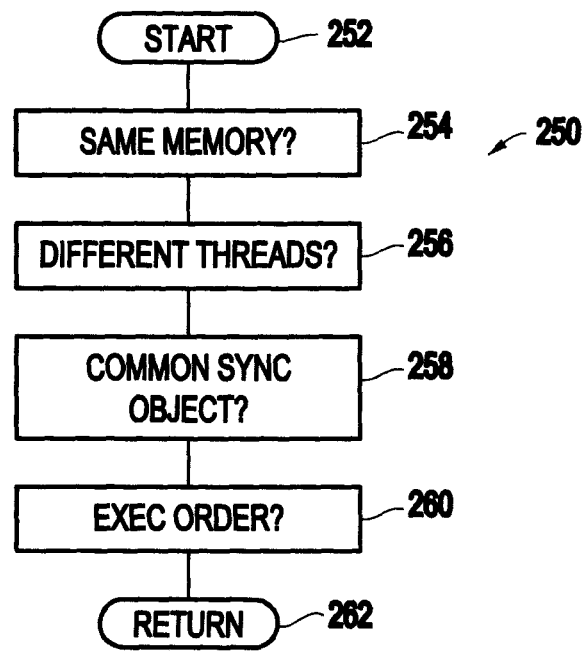
FIG. 2B illustrates a flowchart of an exemplary method in accordance with the present invention.
Figure 3:
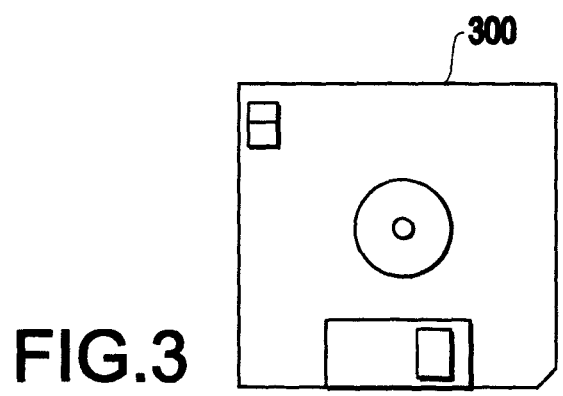
FIG. 3 illustrates a programmable storage medium 300 for storing a program of an exemplary method in accordance with the present invention.

Referring now to the drawings, and more particularly to FIGS. 1-3, there are shown exemplary embodiments of the methods and structures according to the present invention.

FIG. 1 illustrates an exemplary computer processing system on which an embodiment of the present invention may be implemented. The computer system 100 includes one or more application programs and an operating system 108 that operates on a computer platform 104. The platform 104 includes a hardware unit 112 that includes one or more central processing units (CPUs) 116 (which are typically referred to as CPUs/processors), a random access memory (RAM) 114, and an input/output interface 118.

Various peripheral components may be connected to the computer platform 104 including a terminal 126, a data storage device 130, and a printing device 134. The operating system 108 coordinates operation of the various components or the computer system 100. An example of a computer system 100 is the IBM RISC System/6000 (RISC System/6000 is a trademark of the IBM Corporation). It is readily understood that those skilled in the computer arts will be familiar with many equivalent computer systems 100.

The operating system 108 of the present invention provides multi-threading capabilities wherein multiple concurrent threads of control are dispatched within a single shared address space. Examples include the built-in thread support of operating systems supporting the JAVA™ Virtual Machine, Microsoft's Windows NT® operating system, and the POSIX thread package that is available on many operating systems, for instance as the pthreads package of IBM's AIX® operating system.

FIG. 2 shows an overall architecture 200 of one exemplary embodiment of the invention. The first phase is an optional static datarace analysis 202, which produces a static datarace 204 set i.e., a (conservative) set of statements that are identified as potentially participating in dataraces. Any statement that does not belong to the static datarace set is guaranteed to never cause a datarace during execution. If this phase is omitted, then the static datarace set defaults to all statements that contain memory accesses.

The static datarace analysis employed as part of the inventive datarace detection is based on points-to analysis of reference variables (J.-D. Choi, M. Gupta, M. Serrano, V. C. Sreedhar, and S. Midkiff. Escape analysis for Java. In ACM Conference on Object-Oriented Programming systems, Languages, and Applications, pages 1-19, 1999.). The primary advantage of a static analysis approach is its efficiency due to the fact that it incurs no runtime overhead. However, this advantage is mitigated in practice by severe limitations in precision (due to false positive reports) and ease-of-use (due to the requirement of presenting a whole program to the static analysis tool, sometimes augmented with annotations to aid the analysis).

A second phase of an exemplary embodiment of the invention is instrumentation 206, whose goal is to insert trace statements at program points identified in the static datarace set to generate an instrumented executable 208. This insertion process can be optimized, in which case no instrumentation is inserted at redundant trace points i.e., program points whose access events can be ignored since other (non-redundant) trace points will provide sufficient information for datarace detection. The result of the second phase is an instrumented executable 208 that is extended with code to generate access events during program execution.

A third phase in the exemplary embodiment is an optional runtime optimizer 210, which uses a cache (not shown) to identify and discard redundant access events that do not contain new information.

Finally, the runtime detector 212 examines the access events and detects dataraces during the program execution. The instrumentation and runtime detector phases guarantee the precision of the inventive approach, whereas the optimization phases deliver the efficiency that makes the inventive approach practical. The results from the invention show that it is preferable to combine all the optimization phases (static analysis, optimized instrumentation, and runtime optimizer), thereby to obtain maximum performance. The inventive approach contrasts with purely ahead-of-time datarace detection, which attempts to report dataraces that may occur in some possible program execution. Instead, the inventive approach detects dataraces on-the-fly, usually the most convenient mode for the user. If so desired, the inventive approach could be easily modified to perform post-mortem datarace detection by creating a log of access events during program execution and performing the final datarace detection phase off-line.

Even assuming that Eraser's approach is somewhat similar to the present invention in that its datarace detection algorithm is based on lock-based synchronization, Eraser enforces the constraint that each shared memory location is protected by a unique lock throughout an execution. By contrast, an exemplary embodiment of the present invention does not enforce this constraint. Thus, the present invention reports fewer spurious data races. The ownership model of an exemplary embodiment of the invention is based on Eraser's, but Eraser has no comparable handling of the join operation. Eraser works independently of the input source language by instrumenting binary code, but its runtime overhead is in the range of 10 times to 30 times.

As explained above, Praun and Gross's object race detection greatly improves on Eraser's performance by applying escape analysis to filter out non-datarace statements and by detecting dataraces at the object level instead of at the level of each memory location. However, their coarser granularity of datarace detection leads to the reporting of many dataraces which are not true dataraces. For example, on the hedc program, the inventors report dataraces on 5 objects, all of which are true dataraces, while object race detection reports over 100 dataraces, almost all of which are not true dataraces. (The race definitions for object race detection and Eraser imply they always report a super set of the races the inventors report.).

TraDe's datarace detection differs from the present invention in that it is based on the happens-before relation. TRaDe adds a runtime overhead ranging from 4 times to 15 times compared to an interpreter, with approximately 3 times the space overhead.

2. Datarace Conditions and Problems
2.1 Datarace Conditions

The inventors define a datarace as two memory accesses which satisfy the following four conditions: (1) the two accesses are to the same memory location (i.e., the same field in the same object) and at least one of the accesses is a write operation (under certain memory models, two read accesses may also generate a datarace. This framework can be easily applied to such models by dropping the requirement that at least one of the accesses must be a write.); (2) the two accesses are executed by different threads; (3) the two accesses are not guarded by a common synchronization object (lock); and (4) there is no execution ordering enforced between the two accesses, for example by thread start or join operations. The inventors call these conditions the datarace conditions, and observe that they are different from datarace conditions assumed in past work on datarace detection for fork-join programs. In general, the approach of an exemplary embodiment of the invention is applicable to any monitor-style synchronization primitives supported by the programming language, operating system, or user.

2.2 Example

List 1 below shows an exemplary program with three threads main, T1 and T2. Statements are labeled with statement numbers such as T01, the first labeled statement in the main thread. The inventors will also use the notation stmt: expr to denote a field access expression within a statement. For convenience, statements that are not relevant to dataraces have been elided from this example. Note that thread main performs a write access on field x.f at statement T01, before creating and starting threads T1 and T2.

List 1.

```
// THREAD MAIN
class MainThread {
    ...
    public static void main(String args[ ]) {
        ...
T01:    x.f = 100;
        ...
T02:    Thread T1 = new ChildThread(...);
T03:    Thread T2 = new ChildThread(...);
T04:    T1.start( );
T05:    T2.start( );
        ...
    }
} // class MainThread
// CALLED BY THREAD T1
T10: synchronized void foo(...) {
T11:    a.f = 50;
T12:    ...
T13:    synchronized(p) {
T14:        b.g = b.f
        }
    }
// CALLED BY THREAD T2
void bar(...)
T20:    synchronized(q) {
T21:        d.f = 10;
        }
```

Thread T1 calls method foo, which contains three accesses to object fields: a write access T11:a.f, a write access T14:b.g, and a read access T14:b.f. Thread T2 calls method bar, which contains a write access, T21:d.f.

Let us first assume that object references a, b, d and x all point to the same object. All the accesses to the f field in the example will be to the same memory location, thus every pair of them except for (T14:b.f, T14:b.g) satisfies the first of the datarace conditions.

In addition, assume that object references T10:this, T13:p, and T20:q all point to different objects during that execution. Then, no two statement instances belonging to different threads are guarded by the same synchronization object, satisfying the third of the datarace conditions. T1 and T2 are different threads without execution ordering between them via start or join, satisfying the second and the fourth of the conditions. Accesses T11:a.f and T14:b.f thus exhibit a datarace with access T21:d.f. Statement T01 does not cause a datarace with the others in the example because there exists an ordering via start at T04 and T05, not satisfying the fourth of the conditions.

The inventive definition of dataraces identifies both actual and feasible dataraces in a given program execution. This is different from other datarace definitions that model mutual exclusion using the happened-before relation, and exclude feasible dataraces from their definition. For example, let us now assume that T13:p and T20:q point to the same object (which is different from the object pointed to by T10:this).

Therefore, the two synchronized blocks in methods foo and bar are protected by the same lock. If thread T1 acquires the lock before T2, an approach based on the happened-before relation will record the fact that statement T13 must execute before statement T20. Doing so will lead it to conclude that there is a happened-before relation from T11 to T21 (through T13), and that there is no datarace between T11:a.f and T21: d.f. In contrast, the inventive approach reports the feasible datarace between T11:a.f and T21:d.f since it could have occurred if thread T2 acquired the lock before thread T1. In this regard, the inventive definition of dataraces is similar to that of Eraser.

2.3 Thread Start and Join Operations

As the third and the fourth datarace conditions indicate, there are two kinds of inter-thread serialization constructs that can be used to avoid dataraces: mutual exclusion (synchronized methods and blocks) and happened-before relations (thread start and join operations).

To precisely model a join operation using mutual exclusion, the inventors introduce a dummy synchronization object Sj for each thread Tj. The Sj locks are used solely for the purpose of datarace detection, and are not visible to the application. A dummy mon-enter (Sj) operation is performed at the start of Tj's execution, and a mon-exit (Sj) operation is performed at its end. When thread Tj's parent or any other thread performs a join operation on Tj, a dummy mon-enter (Sj) operation is performed in that thread after the join completes. These dummy synchronizations help the datarace detection system observe that the operations following the join cannot execute concurrently with operations in Tj.

It is difficult to model start constraints the same way, because generally one cannot know in advance how many threads will be started by each thread, or which dummy locks should be held prior to starting child threads. Instead, the inventors use an ownership model to approximate the ordering constraints that arise from start operations.

The inventors define the owner of a location to be the first thread that accesses the location. The inventors only start recording data accesses and checking for dataraces on a location when the location is accessed by some thread other than its owner. Though approximate, this approach is sufficient to capture the ordering constraints that arise in the common case when one thread initializes some data that is later accessed by a child thread without explicit locking.

2.4 Datarace Detection

In an exemplary embodiment of the invention the inventors define datarace detection as follows. An access event e is a 5-tuple (m, t, L, a, s) where: m is the identity of the logical memory location being accessed; t is the identity of the thread which performs the access; L is the set of locks held by t at the time of the access; a is the access type (one of WRITE, READ); and s is the source location of the access instruction. Note that source location information is used only in reporting and has no bearing on other definitions and optimizations. Given access events (or, simply, accesses) $e_i$ and $e_j$, the inventors define newline IsRace ($e_i$, $e_j$) as follows:

$$\text{IsRace}(e_i, e_j) \Leftrightarrow (e_i.m = e_j.m) \wedge (e_i.t \neq e_j.t)$$
$$\wedge (e_i.L \cap e_j.L = \emptyset) \wedge$$
$$(e_i.a = \text{WRITE} \vee e_j.a = \text{WRITE}). \tag{1}$$

A program execution generates a sequence of access events E. Performing datarace detection on this execution is equivalent to computing the value of the condition:

$$\exists e_i, e_j \in E | \text{IsRace}(e_i, e_j). \tag{2}$$

2.5 Dataraces Reported

Let FullRace=$\langle e_i, e_j \rangle$ be the set of all access pairs that form a datarace during an execution. Given an execution with N accesses, any algorithm which attempts to detect all pairs in FullRace must have worst-case time and space complexity $O(N^2)$ (since all possible pairs could be in FullRace), costs that could be prohibitive for a large sequence of accesses. To avoid these costs, the inventive detection algorithm does not guarantee enumeration of all pairs in FullRace, although it still performs datarace detection as previously defined.

For each memory location m involved in a datarace, an exemplary detection algorithm in accordance with the invention reports at least one access event participating in a datarace on m. More formally, consider a partitioning of FullRace by memory location into MemRace sets:

$$\text{MemRace}(m_k) = \langle e_i, e_j \rangle \in \text{FullRace} | e_i.m = e_j.m = m_k \tag{3}$$

The inventors use boolean predicate IsRaceOn ($e_i$, m) to indicate whether the event $e_i$ is in a pair in MemRace(m):

$$\text{IsRaceOn}(e_i, m) \Leftrightarrow \exists e_j \langle _i, e_j \rangle \in \text{MemRace}(m). \tag{4}$$

The inventors now define the set of dataraces reported by the inventive approach minimal-dataraces. For each m with non-empty MemRace (m), the inventive dynamic datarace detector detects and reports at least one access event e such that IsRaceOn (e, m)=true.

2.6 Debugging Support

An exemplary embodiment of the invention reports a racing access e at the moment it occurs in the program, and, therefore, the program can be suspended and its current state examined to aid in debugging the race. The algorithm also reports, for some previous access f with IsRace(e, f), f's lock set, and often f's thread. Furthermore, an exemplary static datarace analyzer in accordance with the invention, provides a (usually small) set of source locations whose execution could potentially race with e. In the inventors' experience, this information, combined with study of the source code, has been enough to identify the causes of dataraces.

To obtain full information about rarely occurring dataraces, a program record and replay tool such as DejaVu [J.D. Choi, et al., A perturbation-free replay platform for cross-optimized multithreaded applications. In *Proceedings of the 15th IEEE International Parallel & Distributed Processing Symposium*, April, 2001] can be used, where the dynamic detection runs along with DejaVu recording and the expensive reconstruction of FullRace occurs during DejaVu replay. DejaVu recording incurs approximately 30% time overhead.

3. Runtime Datarace Detection

Since one does not need to report all races in a given program execution, an exemplary embodiment of the invention uses two key techniques to decrease the cost of an exemplary embodiment of the algorithm. The exemplary embodiment's use of the weaker-than relation decreases the number of accesses needed to consider and save, and the representation of the access event history using tries, enables efficient representation and search of past accesses.

3.1 The Weaker-Than Relation

Given two past access events $e_i$ and $e_j$, if for every future access $e_k$, IsRace ($e_j$, $e_k$) implies IsRace ($e_i$, $e_k$), $e_j$ need not be considered when performing datarace detection on future accesses. Since $e_i$ is more weakly protected from dataraces than $e_j$ (or protected equally), the inventors say that $e_i$ is weaker than $e_j$ (or $e_j$ is stronger than $e_i$). Exploiting the weaker-than relationship between accesses allows us to greatly reduce the overhead of the inventive datarace detection algorithm.

A sufficient condition for dynamically determining that event $e_i$ is weaker-than event $e_j$, by using the memory location, access type, thread, and lock set information contained in each event is outlined below. The inventors add the pseudo-thread t⊥ to the possible values of $e.t$ for a past access event e stored by the inventive detector. t⊥ means "at least two distinct threads," and the inventors set $e_i.t$ to t⊥ when the inventors encounter some later event $e_j$ such that $e_i.m = e_j.m$, $e_i.L=e_j.L$, and $e_i.t \neq e_j.t$. The intuition behind $t\bot$ is that once two different threads access a memory location with the same lock set, any future access to that memory location with a non-intersecting lock set will be a datarace (unless all accesses are reads), independent of which threads previously accessed the location. Utilizing $t\bot$ is a space optimization that simplifies implementation of an exemplary embodiment of the invention, but it is also the reason why this embodiment cannot always report the specific thread for the earlier access in a datarace.

The inventors define a partial order $\sqsubseteq$ between two threads $t_i$ and $t_j$, and between two access types $a_i$ and $a_j$, as follows:

$$t_i \sqsubseteq t_j \Leftrightarrow t_i = t_j \vee t_i = t\bot \quad (5)$$

$$a_i \sqsubseteq a_j \Leftrightarrow a_i = a_j \vee a_j = \text{WRITE}. \quad (6)$$

Given these orderings, the inventors can now define the weaker-than partial order $\sqsubseteq$ for accesses:

PROOF. First, $p.m = q.m$ and $q.m = r.m$ implies $p.m = r.m$. Second, $p.L \subset q.L$ and $q.L \cap r.L = \emptyset$ implies $p.L \cap r.L = \emptyset$. Third, $p.t \sqsubseteq \overline{q.t}$ implies that $p.t = t\bot$ or $p.t = q.t$. In either case, $p.t \neq r.t$ since $q.t \neq r.t$. (A new access r cannot have $r.t = t\bot$.) Finally, $p.a \sqsubseteq q.a$ implies $p.a = \text{WRITE}$ or $p.a = q.a$. If $p.a = q.a \neq \text{WRITE}$, $r.a$ must be WRITE.

The exemplary race detector ensures that if one detects that p is weaker than q, we at most store information about the weaker of p and q, decreasing the inventive time and space overhead. In the rare case that the exemplary embodiment reports a spurious datarace, an optimization based on the weaker-than relation could suppress the reporting of a real datarace while allowing the false positive report. Using extra locking inserted by the user to suppress the spurious report overcomes this deficiency. In section 4 and section 6, the inventors show how the weaker-than relation can also be used to filter events before they reach the detector.

3.2 Trie-Based Algorithm

In this section, the inventors describe the inventive runtime datarace detection algorithm and its use of tries to represent the event history.

3.2.1 Detection Algorithm

For each unique memory location in an access event observed by the datarace detector of the exemplary embodiment, the history of accesses to that location is represented using an edge-labeled trie. The edges of the trie are labeled with identifiers of lock objects, and the nodes hold thread and access type information for a (possibly empty) set of access events. The set of locks for an access is represented by the path from the root of the trie to the node corresponding to that access.

Nodes in the inventive tries have a thread field t and an access type field a. Internal nodes which have no corresponding accesses are assigned access type READ and a special thread value $t\bot$ (meaning "no threads"). The inventors define the meet operator $\sqcap$ for thread information $t_i$ and $t_j$ and access information $a_i$ and $a_j$.

$$\forall_i . t_i \sqcap t_i \sqcap t\bot = t_i, a_i \sqcap a_i = a_i \quad (7)$$

$$\forall_i . \forall_j . t_i \sqcap t_j = t\bot \text{ if } t_i \neq t_j \quad (8)$$

$$\forall_i . \forall_j . a_i \sqcap a_j = \text{WRITE if } a_i \neq a_j \quad (9)$$

When the exemplary embodiment encounters an access event e, the system first check if there exists an access $e_p$ in the history such that $e_p \sqsubseteq e$. This check is performed through a traversal of the trie corresponding to e.m, following only edges labeled with lock identifiers in e.L (in depth-first order). During this traversal, the system examines each encountered node's access type and thread information to see if it represents accesses weaker than e, as defined in the previous section. (The traversal procedure guarantees that the lockset and memory location weakness conditions are satisfied.) If the system finds such a node, then it can safely ignore e while maintaining the reporting guarantees described in this disclosure. In practice the vast majority of accesses are filtered by this check.

If the weakness check fails, the exemplary embodiment checks e for dataraces by performing another depth-first traversal of the trie. For each node n encountered, the inventors have one of three cases:

Case I. The edge whose destination is n is labeled with lock identifier $l_n$ such that $l_n \in e.L$. In this case, e shares at least one lock with all the accesses represented by n and its children. Therefore, there cannot be a datarace with any access represented by the subtree rooted at n, and one does not need to search any deeper in this branch of the trie.

Case II. Case I does not hold, $e.t \sqcap n.t = t\bot$, and $e.a \sqcap n.a = \text{WRITE}$. In this case we have a datarace, since e.t differs from some previous thread which accessed e.m, the intersection of their lock sets is empty, and at least one access was a write. We report the race immediately and terminate the traversal.

Case III. Neither case I nor II holds, in which case we traverse all children of n.

3.2.2 Event History Update

After checking for races, an exemplary embodiment of the system updates the trie with information about e. If there is already a node n in the trie whose path to the root is labeled with the locks e.L, the system updates n with $n.t \leftarrow n.t \sqcap e.t$ and $n.a \leftarrow n.a \sqcap e.a$. (Such an n can be efficiently found; we maintain the invariant that the label on an edge leading into a node n', under some total order on locks, is less than the labels on the edges leading out of n. This guarantees that we can find the node for lock set e.L in time $O(|e.L|)$ by following edges in the order of sorted e.L.) If no such n exists then the system adds nodes and edges to create such an n, setting n.t to e.t and n.a to e.a. Finally, we traverse the trie once more to remove all the stored accesses which are stronger than the newly-added access.

3.3 Implementation

An exemplary embodiment of the invention has been implemented in Java, and the code is straight forward. The algorithm runs online alongside the program being analyzed. (The interface between the algorithm and the program is discussed below.)

An exemplary embodiment of the invention uses memory addresses to identify logical memory locations. Garbage collection can move objects to different addresses and reuse the same addresses for different objects. An exemplary embodiment of the invention could respond to garbage collection by augmenting the object address information stored in data structures, but for a preferred exemplary implementation enough memory is used so that garbage collection does not occur.

4. Runtime Optimization

The algorithm for the exemplary embodiment described above reads an event stream generated by the running target program. To reduce the overhead of race detection, the embodiment reduces the number of access events that need to be fed into the detector, using a combination of static and dynamic techniques. This following describes the dynamic technique of caching to detect redundant accesses.

4.1 Overview

The description above describes how an access is discarded if an exemplary embodiment of the invention has already seen a "weaker" access. Experiments show that in many benchmarks almost all accesses are discarded this way. Therefore, the exemplary embodiment makes the check for a previous weaker access as efficient as possible, by introducing caches to record previous accesses. There are two caches per thread, one recording read accesses and one recording write accesses. Each cache is indexed by memory location. Whenever the program performs an access to location m, the exemplary embodiment looks up m in the appropriate cache. The cache design guarantees that if an entry is found, there must have been a weaker access already recorded by the algorithm, so no further work is required. If no entry is found, then the exemplary embodiment sends information about the new access to the runtime detector and also add a corresponding new entry to the cache.

4.2 Cache Policy

Recall that access p is weaker than access q iff $p.m=q.m \wedge p.Locks \subseteq q.Locks \wedge p.t \sqsubseteq q.t \wedge p.a \sqsubseteq q.a$. The exemplary embodiment requires that if entry for access p is found in the cache when new access q is checked, then p is weaker than q.

To guarantee that $p.t \sqsubseteq q.t$, the inventors observed that q.t is simply the currently executing thread when q occurs. Therefore, the exemplary embodiment uses separate caches for each thread. Any p found in thread q.t's cache must have p.t=q.t. (This also ensures that cache operations do not require synchronization.)

Because an exemplary embodiment of the invention may use separate caches for reads and writes, if the embodiment finds entry p when it looks up the cache then certainly their access type is the same, i.e., p.a=q.a.

To ensure that $p.Locks \subseteq 6q.Locks$, an exemplary embodiment of the invention monitors the set of locks currently held by each thread. Whenever the program executes monitor exit to release a lock 1, the system evicts from the cache any p such that $1 \in p.Locks$. This ensures that at all times, for every p in the cache, p.Locks is a subset of the currently held locks. Hence, when q occurs we know $p.Locks \subseteq q.Locks$ for all p in the cache.

Note that because Java synchronization blocks are reentrant, a thread might execute monitor exit but not actually release the lock because the lock had previously been acquired more than once. An exemplary embodiment of the invention ignores these "nested" locks and unlocks; only the last monitor exit on a lock object requires cache entries to be evicted.

Each cache is indexed by memory location alone. Because the inventive policy guarantees all entries in the cache are weaker than the access being looked up, the embodiment does not actually have to check the thread ID, access type, or lock set, and they are not stored in the cache entries.

When a thread releases a lock 1, the system needs to quickly evict all the cache entries whose lock sets contain 1. An exemplary embodiment of the invention exploits the nested locking discipline imposed by the Java language (although not by the byte code language—the system relies on the fact that the byte code was generated by a Java compiler). The discipline ensures that at the time some access generated a cache entry p, if lock 1 was the last lock in p.Locks to be acquired, then lock 1 will be the first of p.Locks to be subsequently released ("last in, first out"). Therefore for each lock 1 currently held by the thread, the embodiment keeps a linked list of the cache entries p where 1 was the last lock in p.Locks to be acquired. When 1 is released the embodiment evicts all the entries on its list from the cache. The lists are doubly-linked so that individual cache entries can be quickly removed when they are evicted due to cache conflicts.

4.3 Implementation

An exemplary embodiment of the invention uses two 256-entry direct mapped caches, one for reads and one for writes, indexed by memory address. The hash function multiplies the 32-bit memory address by a constant and takes the upper 16 bits of the result. The cache code is entirely written in Java and is executed on the Jalapeño virtual machine (B. Aplern, et al. The Jalapeño virtual machine. IBM Systems Journal, 39(1), 2000.). We ensure that the Jalapeño optimizing compiler inclines all calls to the cache lookup methods in the user's program. The embodiment also use Jalapeño specific method calls to ensure that the cache lookup code is compiled into efficient machine code (e.g., without array bounds checks). A cache lookup which results in a hit requires ten PowerPC instructions in this embodiment.

5. Static Datarace Analysis

An exemplary embodiment of the static datarace analysis algorithm in accordance with the invention formulates datarace analysis as a conjunction of interthread control flow analysis and points-to analysis of thread objects, synchronization objects, and access objects.

The embodiment uses this formulation to compute the static datarace set, a set of statement pairs that may cause a datarace during some execution. Statements that are not part of any statement pair in the static datarace set are non-datarace statements and need not be instrumented at all.

The inventors next describe a static formulation of the datarace conditions. The inventors then describe the interthread control flow graph (ICFG) that may be used to represent sequential and parallel interprocedural control flow, and the ICFG-based points-to analysis that can be used to compute the static formulation of the datarace conditions. Finally, the inventors describe an extension of escape analysis that can be used to improve the precision of static datarace analysis.

5.1 Datarace Conditions

For two statements x and y, the datarace conditions defined in conditions set forth above can be formulated conservatively as follows for static analysis (For convenience, the inventors ignore the fourth of the datarace conditions in, and conservatively assume that it always holds.):

$$\text{IsMayRace}(x, y) \Leftarrow \text{AccessesMayConflict}(x, y) \wedge (\neg \text{MustSameThread}(x, y)) \wedge (\neg \text{MustCommonSync}(x, y)) \qquad (10)$$

AccessesMayConflict (x, y)=true if executions of x and y may access the same memory location, so an exemplary embodiment may use may points-to information for its computation. For example in List 1, an exemplary embodiment uses may points-to information for object references T11:a and T21:d to statically determine whether they may access the same memory location during some execution.

MustSameThread (x, y)=true if x and y are always executed by the same thread, so the exemplary embodiment uses must points-to information on thread objects for its computation. In List 1, an exemplary embodiment of the invention uses must points-to information on the thread objects that can run T11 or T21 to statically determine whether the two statements may be executed by different threads.

MustCommonSync (x, y)=true if x and y are always synchronized by at least one common lock, so the system uses must points-to information on synchronization objects for its computation. In List 1, an exemplary embodiment of the invention uses must points-to information on the synchronization objects pointed to by T10:this and T20:q to statically determine whether the two statements may be executed under different synchronization objects.

It is worth noting that may-alias approximations of MustSameThread and MustCommonSync cannot be correctly used in conservative datarace analysis, because the datarace conditions refer to the complements of these sets.

5.2 Interthread Control Flow Graph (ICFGg)

The ICFG is a detailed interprocedural representation of a multithreaded program in which nodes represent instructions (i.e., statements) and edges represent sequential and parallel control flow. Each method and each synchronized block has distinguished entry and exit nodes in the ICFG.

An ICFG contains four types of control flow edges: intraprocedural (The inventors assume that the intraprocedural edges capture all intraprocedural control flow, including control flow arising from exceptions.), call, return, and start. The first three types are present in a standard interprocedural control flow graph. Start edges are unique to the ICFG, and represent invocations of the start( ) method of a Thread object, which starts the thread and invokes its run( ) method. All other invocations of a run( ) method execute as part of the calling thread. (Join edges are not included in the ICFG because they are not needed for the conservative static datarace analysis.)

Start edges are referred to as interthread edges, while all other edges in the ICFG are called intrathread edges. The entry node that is a target of a start edge is called a thread-root node. An ICFG path without any interthread edges is an intrathread path, and an ICFG path with one or more interthread edges is an interthread path.

The inventors use the interthread call graph (ICG) as the interprocedural abstraction of the ICFG, designed for practical and scalable analysis of large programs. An ICG node is created for each method and each synchronized block in the ICFG. The inclusion of separate ICG nodes for synchronized blocks is a notable difference between the ICG and standard call graphs.

The inventors call a node in the ICG a synchronized node if it represents either a synchronized method or a synchronized block.

5.3 Points-To Analysis

The points-to analysis that the inventors employ for a static datarace analysis is a flow-insensitive, whole program analysis. In an exemplary analysis in accordance with the invention, a distinct abstract object is created for each allocation site in the program. Each abstract object represents all the concrete objects created at the same site during execution. The points-to analysis computes for each access in the program the set of abstract objects it points to along some path.

A precise must points-to analysis is expensive in general. The inventors have devised a simple and conservative must points-to analysis based on the notion of single-instance statements, each of which executes at most once during an execution. An object created at a single-instance statement is called a single-instance object. If an access points to only one abstract object and that abstract object is a single-instance object, then the relation between the access and the object is a must points-to relation. (The inventors use a special "null" object to represent a null reference.)

Let MustPT (x) and MayPT (x) be the must and may points-to sets of access x. We compute AccessesMayConflict (x,y) of Equation (1) as follows0 using points-to information:

$$AccessesMayConflict(x,y)= \quad (11)$$

(MayPT (x)∩MayPT (y)≠∅)∧(field (x)=field (y)), where field (x) refers to the accessed field of the object (or class).

For access u, let ThStart(u) be the set of thread-root nodes from whose entry nodes there exists an intrathread ICFG path to u. We compute MustSameThread(x, y) as follows using points-to information:

$$MustThread(u)=\cap_{v \in ThStart(u)} MustPT(v.this) \quad (12)$$

$$MustSameThread(x, y)=(MustThread(x) \cap MustThread(y) \neq \emptyset), \quad (13)$$

where v.this denotes the this pointer of thread-root node v. For node n∈ICG, let Synch (n)=true if n is a synchronized method or block, and let $u_n$ be the access of the synchronization object if Synch (n)=true. Also, let Pred(n) be the set of intrathread} predecessor nodes of n on ICG. We compute Must Sync (v) by the following set of dataflow equations:

$$Gen(n)=MustPT(u_n) \text{ if } Synch(n) \quad (14)$$

$$Gen(n)=\emptyset \text{ otherwise}$$

$$SO^n{}_o=SO^n{}_i \cup Gen(n), SO^n{}_i=\cap_{p \in Pred(n)} SO^p{}_o \quad (15)$$

$$MustSync(v)=SO^n{}_o, \forall v \in n. \quad (16)$$

Now, we compute MustCommonSync(x, y) as follows:

$$MustCommonSync(x,y)=(MustSync(x) \cap MustSync(y) \neq \emptyset). \quad (17)$$

Finally, we compute IsMayRace in Equation 10 by combining Equations 11, 13, and 17.

5.4 Extending Escape Analysis

Past work on escape analysis normally identifies objects as thread-local when they are never reachable from threads other than the thread that created them. A thread-local object can never participate in a datarace.

Java code frequently uses objects associated with a thread T which does not follow the above pattern but which are not susceptible to data races. In particular, we say an object O is "thread-specific" to T if all accesses to O are performed while T is being constructed (and before T starts running), or by T itself.

References to such objects are typically stored in fields of the T object and hence escape to the thread creating T, and are not thread-local as described above. Because this usage is common, we extended the inventive static analysis to identify some thread-specific objects.

The inventors have implemented a simple, but effective, approximation algorithm to compute the thread-specific objects. First, we define the thread-specific methods recursively as follows:

(1) initiate methods of thread objects, and run methods that are not invoked explicitly (i.e., invoked only as a result of the thread being started) and (2) a non-static method all of whose direct callers themselves are thread-specific non-static methods passing their this references as the this reference of the call ee.

Second, we define the thread-specific fields as the fields of a thread that are only accessed via getfield/putfield operations on the this reference of a thread-specific method.

Finally, we define an unsafe thread as a thread whose execution may start before its initialization completes. A thread object is conservatively identified as unsafe if its constructor can transitively call Thread.start or if the this reference escapes from the constructor. (A thread is safe if it is not unsafe.)

Based on these definitions, we say an object is thread-specific to T if T is safe and the object is only reachable from thread-specific methods of T or through thread-specific fields of T. Accesses to a thread-specific object of a safe thread cannot be involved in a datarace. Moreover, accesses to thread-specific fields cannot be involved in a datarace.

6. Compile-Time Optimizations

The static datarace analysis phase of an exemplary embodiment of the invention improves the performance of a dynamic detector by eliminating from consideration statements that can never participate in a datarace. Another approach to compile-time optimization stems from the weaker-than relation defined above. If the execution of a statement always generates an access that will be discarded because a previous access is weaker, the statement need not be instrumented. In the following description, the inventors describe how an exemplary embodiment of the inventions uses a static form of the weaker-than relation and a loop peeling transformation to avoid inserting instrumentation that the inventors can prove will only produce redundant access events.

6.1 Static Weaker-Than Relation

Let Events (S) denote the set of access events generated by instrumentation statement S in a given execution. The inventors define the static weaker-than relation for statements as follows:

$S_i$ is weaker than $S_j$, written as $S_i \sqsubseteq S_j$, iff in all $e \in$ Events $(S_j)$ in any given execution, there exists $e_i$ in Events $(S_i)$ in the same execution such that (1) $e_i \sqsubseteq e_j$, where $e_i \sqsubseteq e_j$ as defined above, and (2) there exists no thread start( ) or join( ) between $e_i$ and $e_j$.

A sophisticated interprocedural analysis would be required to determine $S_i \sqsubseteq S_j$ for arbitrary $S_i$ and $S_j$. However, the inventors developed a conservative and effective analysis for computing $S_i \sqsubseteq S_j$ when $S_i$ and $S_j$ belong to the same method.

The inventors model the instrumentation which generates access events using a pseudo-instruction trace (o, f, L, a), where o is the object being accessed, f is the field of the object being accessed, L is the lock set held during the access, and a is the access type (READ or WRITE). All operands are treated as uses of their values. For accesses to static fields, o represents the class in which the field is declared, and for accesses to array elements, f represents the array index. Thread information is not explicitly modeled in the trace instruction since we do not attempt to optimize across thread boundaries (thread information is available to the instrumentation code at runtime). We insert a trace pseudo-instruction after every instruction which accesses a field of an object, a static field, or an array element (optionally using information from static datarace analysis to eliminate consideration of instructions which cannot be involved in dataraces).

After insertion, the inventors attempt to eliminate trace pseudo-instructions using the static weaker-than relation. First, we define Exec $(S_i, S_j)$ for statements $S_i$ and $S_j$ of the same method as follows:

Exec $(S_i, S_j)$ is true iff (1) $S_i$ is on every intraprocedural path that contains $S_j$, and (2) there exists no method invocation on any intraprocedural path between $S_i$ and $S_j$. The first condition indicates that whenever $S_j$ executes in an execution instance of the method, $S_i$ also executes.

Two well-known concepts can be used for computing Exec $(S_i, S_j)$: $S_i$ dominates $S_j$, written dom $(S_i, S_j)$, and $S_i$ post-dominates $S_j$, written newline pdom $(S_i, S_j)$.

In experiments, the inventors used dom. (It is very difficult to prove that one statement post-dominates another in Java, because almost any statement can throw an exception, and therefore we suspect that pdom would not be effective.) The second condition guarantees that no path between Si and Sj will contain start( ) or join( ).

With Exec, the static weaker-than relation can be decomposed into the following easily verifiable conditions (notation to be explained):

$$S_i \sqsubseteq S_j \Leftarrow \text{dom}(S_i, S_j) \wedge a_i \sqsubseteq a_j \wedge \text{outer } (S_i, S_j) \quad (18)$$

$$\wedge \text{valnum}(o_i) = \text{valnum}(o_j) \wedge f_i = f_j.$$

To show that a statement $S_i$=trace $(o_i, f_i, L_i, a_i)$ always generates an event $e_i$ weaker than any $e_j$ produced by $S_j$=trace $(o_j, f_j, L_j, a_j)$, we must show that $e_i.t \sqsubseteq e_j.t$, $e_i.a \sqsubseteq e_j.a$, $e_i.L \sqsubseteq e_j.L$, $e_i.m=e_j.m$. Intraprocedurally, $e_i.t$ will always equal $e_j.t$, and we can directly check $a_i \sqsubseteq a_j$ which implies $e_i.a \sqsubseteq e_j.a$. An exemplary embodiment of the invention checks that $e_i.L \subseteq e_j.L$ using the nesting of Java's synchronization blocks. Specifically, the embodiment verifies the condition outer $(S_i, S_j)$, which is true if and only if $S_j$ is at the same nesting level in synchronization blocks as $S_i$ or at a deeper level within $S_i$'s block. Finally, to show that $e_i.m=e_j.m$, the embodiment checks that (valnum $(o_i)$=valnum $(o_j) \wedge (f_i=f_j)$, where valnum $(o_i)$ is the value number of the object reference. If all of these conditions hold, then $S_i \sqsubseteq S_j$, and therefore we can safely eliminate $S_j$.

6.2 Implementation

In the following description, the inventors briefly describe the implementation infrastructure that we use for optimized instrumentation. The instrumentation and the analysis of the weaker-than relation is performed during the compilation of each method by a Jalapeño optimizing compiler. The inventors created a new instruction in the high-level intermediate representation (HIR) of the compiler corresponding to the inventive trace pseudo-instruction, and these instructions are inserted as previously described. After the insertion of the trace statements, conversion to static single assignment (SSA) form is performed, during which the dominance relation is computed. Elimination of redundant trace statements is then performed based on the static weaker-than relation, utilizing an existing value numbering phase. The remaining trace statements are marked as having an unknown side effect to ensure they are not eliminated as dead code by Jalapeño's other optimization phases unless they are truly unreachable.

After the completion of some of Jalapeño's HIR optimization phases, we expand each trace statement into a call to a method of the inventive dynamic detector, and we force Jalapeño to inline this call, Jalapeño then optimizes the HIR again. Finally, the HIR representation is converted to lower-level representations (and eventually to machine code) by the compiler, without further instrumentation-specific optimization.

6.3 Loop Peeling

Loops can be a key source of redundant access events. For example, in the loop in List 2, consisting of statements S10 through S13, statement S13 will produce redundant access events after the first iteration of the loop, since the information is the same as that recorded in the first iteration. However, two issues make these redundant events difficult to statically eliminate. The inventive redundancy elimination based on the static weaker-than relation cannot be applied to remove the instrumentation, since the information produced in the first iteration of the loop is not redundant. Furthermore, we cannot perform standard loop-invariant code motion to hoist the instrumentation outside the loop, because statement S11 is a potentially excepting instruction (PEI); it may throw an exception and bypass the remaining instructions of the loop. Thus statement S13 is not guaranteed to execute even if the loop condition is initially true. PEIs occur frequently in Java because of safety checks such as null-pointer and array bounds checks.

| List 2 |
| --- |
| // Before optimization. |
| S00: A a; |
| S10: for(...) { |
| S11: PEI |

List 2

```
S12:       a.f = ...;
S13:       trace (a, f, L, W)
// After optimization.
S20:  if (...) {
S21:       PEI
S22:       a.f = ...;
S23:       trace (a, f, L, W);
S24:       for (...) {
S25:            PEI
S26:            a.f = ...;
```

An exemplary embodiment of the invention reduces the generation of redundant access events in loops using a loop peeling program transformation. This transformation creates a new copy of the body of the loop for the first iteration and utilizes the original body for the remaining iterations. Statements S20 through S26 show the result of loop peeling and the inventive existing redundancy elimination applied to the loop of S00. The if statement at S20 is needed to guard against the possibility of the loop not executing at all. The for statement at S24 is modified to ensure that the loop will not execute the first iteration, which is now executed by statements S21 through S23. After the loop peeling, the trace statement in the loop body can be eliminated since statement S23 is statically weaker. The resulting code traces the write access to a.f at most once, achieving the goal of eliminating the instrumentation from the loop.

All of the preceding discussion ignores the effects of the "ownership model". Below, the inventors briefly consider how the ownership model interacts with other machinery.

The inventors modified the inventive runtime race detector of an exemplary embodiment of the invention to record for each memory location an owner thread t0, the first thread to access the memory location. Every time the location is accessed the embodiment checks to see if the current thread is t0, and ignore the access in that case. The first time the current thread is not t0, we say the memory location becomes shared; we set to $t\perp$ and send this access event and all subsequent events on to the rest of the detector, as described above. Essentially, the access event stream is filtered to only include accesses to memory locations in the shared state.

The run-time and compile-time optimization phases rely on the concept of one access event $e_1$ being "weaker-than" another event $e_2$, in which case $e_2$ can be suppressed. Unfortunately, in the presence of the ownership model, the definitions of IsRace and weaker-than in section 3.1 are not sufficient to guarantee that $e_1$ weaker-than $e_2$ implies $e_2$ can be suppressed. The difficulty arises when an event $e_1$ is sent to the detector while $e_1.m$ is in the owned state, and then $e_1.m$ changes to the shared state before $e_2$ occurs. In this situation $e_2$ should not be suppressed.

For run-time optimization (i.e., the cache), an exemplary embodiment can avoid this problem by forcibly evicting a location m from each thread's cache when it becomes shared.

It is harder to avoid this problem in compile-time optimization. Given two statements $S_1$ and $S_2$, it is generally difficult to prove that the accessed location's state cannot change from "owned" to "shared" between $S_1$ and $S_2$. Introducing a dynamic check of the ownership state at $S_1$ or $S_2$ would eliminate the benefit of the optimization. The only truly sound compile-time approach would be to use the post-dominance relationship; i.e., when $S_2$ post-dominates $S_1$ and the access at $S_2$ is guaranteed to be weaker than $S_1$, remove the instrumentation at $S_1$. This is safe because if the object is owned at $S_2$, and therefore the access is suppressed, then the object must also have been owned at $S_1$ and that access can also be suppressed. Unfortunately, as previously noted, post-dominance between $S_1$ and $S_2$ almost never holds in Java because almost any byte code instruction can throw an exception. (This might be less of a problem in other languages such as C or C++.)

An exemplary embodiment of the invention simply ignores the interaction between weaker-than and the ownership model, for both static and dynamic optimizations. This means that in theory this embodiment may inadvertently suppress accesses and thus fail to report races. However, the inventors did not observe any such problems in practice; in experiments the inventors verified that the same races were reported whether the optimizations using the "unsafe" weaker-than relation were enabled or disabled.

TABLE 1

| Example | Lines of Code | Num. Dynamic Threads | Description |
|---|---|---|---|
| mtrt | 3751 | 3 | MultiThreaded Ray Tracer from SPECJVM98 |
| tsp | 706 | 3 | Traveling Salesman Problem solver from ETH [14] |
| sor2 | 17742 | 3 | Modified Successive Over-Relaxation benchmark from ETH [14] |
| elevator | 523 | 5 | A real-time desecrate event simulator |
| hedc | 29948 | 8 | A Web-crawler application kernel developed at ETH [14], using a concurrent programming library by Doug Lea |

7. Experimental Results

Here the inventors present evidence showing: that the inventive definition of dataraces captures truly unsynchronized accesses with fewer "false alarms" than alternative definitions, and that those dataraces can be detected with modest overhead, especially compared to other datarace detection implementations.

7.1 Program Examples

We derived sor2 from the original sor benchmark by manually hoisting loop invariant array subscript expressions out of inner loops. This optimization could be performed by a compiler using only intraprocedural analysis, but it is not implemented in Jalapeño, and it has significant impact on the effectiveness of the inventive optimizations. The inventors modified elevator slightly to force it to terminate when the simulation finishes (normally it just hangs).

The elevator and hedc benchmarks are interactive and not CPU-bound, and, therefore, we do not report performance results for these benchmarks.

7.2 Performance

Table 2 below shows the runtime performance of an exemplary embodiment of the invention and some selected variants to demonstrate the impact of each of the inventive optimizations. "Base" records the performance of each example without any instrumentation (and without loop peeling). "Full" is the inventive complete algorithm with all optimizations turned on. "NoStatic" is "Full" but with the static datarace detection turned off, so all access statements are potential dataraces. "NoDominators" is "Full" with the static weaker-than check disabled; it also disables loop peeling (which is useless without that check). "NoPeeling" turns off loop peeling only. "NoCache" disables the cache.

TABLE 2

| Example | Base | Full | No-Static | No-DoMinators | No-Peeling | No-Cache |
|---|---|---|---|---|---|---|
| mtrt | 9.0 s | 10.9 s (20%) | Out of Memory | 10.9 s (21%) | 10.9 s (21%) | 11.4 s (26%) |
| tsp | 10.0 s | 14.2 s (42%) | 27.5 s (175%) | 15.7 s (57%) | 15.7 s (57%) | 381.7 s (3722%) |
| sor2 | 2.4 s | 2.7 s (13%) | 2.7 s (13%) | 9.8 s (316%) | 7.7 s (226%) | 3.2 s (37%) |

In mtrt without static datarace detection, we instrument so many accesses that Jalapeño runs out of memory before the program terminates.

For each configuration, the inventors ran the program five times in one invocation of the Jalapeño VM and reported the best-performing run. The inventors enabled full optimization in Jalapeño but disabled adaptive compilation. Jalapeño was configured to use a mark-and-sweep garbage collector, but we set the heap size to 1 GB of RAM so no GC actually occurred. The test machine had a single 450 MHz POWER3 CPU running AIX.

These overheads are lower than for any previously reported dynamic datarace detection algorithm. The benefits of each optimization vary across benchmarks, but each optimization is vital for some benchmark. Programs such as tsp, with loops involving many method calls and even recursive method calls, benefit greatly from the cache. Programs such as sor2, which are dominated by loops over arrays, benefit most from dominator analysis and loop peeling.

The inventors did not measure space overhead directly; Jalapeño mixes program data with virtual machine data, making space measurements difficult. The instrumentation consumed the most space for tsp, requiring approximately 16K of memory per thread (for 3 threads) and 7967 trie nodes holding history for 6562 memory locations. We estimate the total amount of memory used by instrumentation for tsp to be about 500K.

7.3 Accuracy

Table 3 below records the number of objects for which we report dataraces using the inventive algorithm and some selected variants. (We normally output each object field on which a datarace occurs; for comparison purposes, here we count only the number of distinct objects mentioned.) "Full" is the inventive complete, most precise algorithm.

TABLE 3

| Example | Full | FieldsMerged | NoOwnership |
|---|---|---|---|
| mtrt | 2 | 2 | 12 |
| tsp | 5 | 20 | 241 |
| sor2 | 4 | 40 | 1009 |
| elevator | 0 | 0 | 16 |
| hedc | 5 | 10 | 29 |

"FieldsMerged" is another exemplary embodiment of the inventive algorithm where we do not distinguish different fields of the same object, so one thread accessing o.$f_1$ might appear to datarace with another thread accessing o.$f_2$ if they do not hold a common lock. (Static fields of the same class are still distinguished.) "NoOwnership" is another variant of "Full" which does not wait for a location to be touched by multiple threads before starting to monitor its accesses.

We report two dataraces in mtrt. Accesses to the field RayTrace.threadCount are not synchronized, causing its value to potentially become invalid; fortunately its value is not actually used. There are also unsynchronized accesses to ValidityCheckOutputStream.startOfLine in the SPEC test harness, which could result in incorrect output.

tsp has a serious datarace on TspSolver.MinTourLen, newline which can lead to incorrect output. We also report dataraces on fields of TourElement, which cannot in fact happen due to higher-level synchronization.

The dataraces we report in sor2 are not truly unsynchronized accesses; the program uses barrier synchronization, which is not captured by an exemplary embodiment of the inventive algorithm.

The dataraces we report in hedc are all true unsynchronized accesses and have two causes. The size of a thread pool is read and written without appropriate locking, which could cause the pool size to become invalid. More seriously, there is an unsynchronized assignment of null to field Task.thread, which could cause the program to die with a NullPointerException if the Task completes just as another thread calls Task.cancel. This would be nearly impossible to find during normal testing and debugging. In fact, previous work mistakenly classified this datarace as benign (possibly because they had to sort through a number of spurious datarace reports).

If we fail to distinguish fields, in hedc we produce spurious race reports in the LinkedQueue class where some fields are immutable and accessed without synchronization and others are not. It also produces spurious warnings for MetaSearchRequest objects where some fields are thread-local and others are shared and require synchronization. In tsp we report additional spurious dataraces on fields of TourElement.

In all benchmarks, NoOwnership reports many spurious dataraces when data is initialized in one thread and passed into a child thread for processing. Previous work such as Eraser and object datarace detection uses a looser definition of dataraces, where a datarace is deemed to have occurred on a location m if there is no single common lock held during all accesses to m. This approach produces spurious datarace reports in mtrt, where variables holding I/O statistics are accessed by two child threads holding a common lock syncObject, but also by a parent thread after it has called join on the two child threads but without any other synchronization. The inventive scheme for representing join introduces pseudolocks $S_1$ and $S_2$; the three threads access the variables with lock sets {$S_1$, syncobject,} {$S_2$, syncobject} and {$S_1$, $S_2$}.

We report no datarace because these lock sets are mutually intersecting, although they have no single common lock. In summary, for these benchmarks, most of the dataraces we report are true unsynchronized accesses, and most of those correspond to real bugs. Using a less strict definition induces significantly more spurious reports.

It is noted that while the JAVA™ programming language is mentioned specifically herein, the present invention is not strictly limited to implementation with the JAVA™ program. Indeed, the present invention can be tailored, as would be known by one of ordinary skill in the art in the context of the present application, to be operable with other concurrent programs.

FIG. 2B details a flowchart of a control routine in accordance with an exemplary embodiment of the invention. The control routine 250 starts at step 252 and continues to step 254. In step 254, the control routine determines whether a first and second memory access is to the same memory location and continues to step 256. In step 256, the control routine determines whether the first and second memory accesses are executed by different threads in a program and continues to step 258. In step 258, the control routine determines whether the first and second memory access are guarded by a common synchronization object and continues to step 260. In step 260, the control routine determines whether there is an execution ordering enforced between the first and second memory accesses and continues to step 262 where the control routine stops. Based, upon these determinations an dataraces may be detected.

As shown in FIG. 3, in addition to the hardware and process environment described above, a different aspect of the invention includes a computer-implemented method for datarace detection, as described above. As an example, this method may be implemented in the particular hardware environment discussed above with reference to FIG. 1.

Such a method may be implemented, for example, by operating the CPU 116 (FIG. 1), to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor incorporating the CPU 116 and hardware above, to perform a method of detecting dataraces.

This signal-bearing media may include, for example, RAM 114 contained externally or within the CPU 116, as represented by fast-access storage for example. Alternatively, the instructions may be contained in another signal-bearing media, such as data storage 130 (FIG. 1) or a magnetic data storage diskette 300 (FIG. 3), directly or indirectly accessible by the CPU 116.

Whether contained in the diskette 300, the computer 100, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical tape, etc.), paper "punch" cards, or other suitable signal-bearing media including transmission media such as digital and analog and communication links and wireless. In an exemplary embodiment of the invention, the machine-readable instructions may include software object code, compiled from a language such as "C", etc.

Thus, while the invention has been described in terms of an exemplary embodiment, those skilled in the art will recognize that the invention can be practiced with modifications.

What is claimed is:

1. A method of detecting a datarace between memory accesses within a program, said method comprising:
    determining, as executed by a processor on a computer, whether a datarace exists between a first access event in a first statement and a second access event in a second statement;
    if it is determined that a datarace exists between the first and second statements, adding said first and second statements to a list;
    determining whether a third statement is more weakly protected than at least one of the first statement and the second statement, said determining whether said third statement is more weakly protected comprises determining whether the third statement has a lockset which is a subset of locksets of the corresponding first and second statements; and
    if the third statement is determined to be more weakly protected than at least one of the first statement and the second statement, replacing the corresponding at least one of said first and second statements in the list with the third statement.

2. The method of claim 1, wherein information is thereby stored in said list only about the weaker of said first, second, and third statements.

3. The method of claim 2, wherein said determining whether said third statement is more weakly protected comprises adding a pseudothread to possible values of past access events being stored.

4. The method of claim 3, wherein said pseudothread comprises at least two distinct threads.

5. The method of claim 3, further comprising setting said past stored event to said pseudothread when said second memory access accesses the same memory location as the first stored event, includes the same lockset as the first stored event and the first memory access and the second memory access are from two distinct threads.

6. The method of claim 1, further comprising generating a history of accesses using an edge-labeled trie based upon past memory accesses including said first memory access.

7. The method of claim 6, wherein the edge-labeled trie includes edges labeled with identifiers of lock objects and nodes holding thread and access type information.

8. The method of claim 7, wherein said determining comprises traversing the edge-labeled trie.

9. The method of claim 8, further comprising conducting a second traversal of the edge-labeled trie to determine whether the second memory access shares at least one lock with the first memory access.

10. The method of claim 9, wherein if the second memory access does not share at least one lock with the first memory access, said method further comprises determining whether the second memory access is from a thread source different from the first memory access and if one of the first memory access and the second memory access comprises a write operation.

11. The method of claim 8, further comprising updating the edge-labeled trie with information based on said second memory access.

12. The method of claim 11, further comprising traversing the edge-labeled trie a third time to remove all accesses which are stronger than the second memory access.

13. The method of claim 1, wherein said determining uses a different cache for each thread.

14. The method of claim 1, wherein said determining comprises monitoring a set of locks currently held by each thread.

15. The method of claim 14, wherein said determining further comprises evicting all cache entries whose lockset contains a lock being released.

16. The method of claim 1, wherein said datarace is defined as:
    the two accesses are to a same memory location;
    the two accesses are executed by different threads;
    the two accesses are not guarded by a common synchronization object; and
    there is no execution ordering enforced between the two accesses.

17. An apparatus comprising at least one processor executing a computer program, said apparatus additionally executing a method of detecting a datarace between memory accesses within said program, said method comprising:
    determining whether a datarace exists between a first access event in a first statement and a second access event in a second statement;
    if it is determined that a datarace exists between the first statement and the second statement, generating a list which includes said first and second statements;
    determining whether a third statement is more weakly protected than at least one of the first statement and the second statement, said determining whether said third statement is more weakly protected comprises determining whether the third statement has a lockset which is a subset of the lockset of one of the corresponding first statement and the second statement; and
if the third statement is more weakly protected than a corresponding one of the first statement and the second statement, replacing the corresponding at least one of the first and second statements in the list with the third statement.

* * * * *